March 7, 1950

E. W. KELLOGG

CONTROL TRACK SOUND DISTRIBUTION SYSTEM AND RECORD THEREFOR 2,499,587

Filed Feb. 14, 1947

3 Sheets-Sheet 1

INVENTOR.
EDWARD W. KELLOGG
BY
[signature]
ATTORNEY

March 7, 1950 | E. W. KELLOGG | 2,499,587
CONTROL TRACK SOUND DISTRIBUTION SYSTEM AND RECORD THEREFOR Filed Feb. 14, 1947 | 3 Sheets-Sheet 2

INVENTOR.
EDWARD W. KELLOGG
BY [signature]
ATTORNEY

March 7, 1950 E. W. KELLOGG 2,499,587

CONTROL TRACK SOUND DISTRIBUTION SYSTEM AND RECORD THEREFOR

Filed Feb. 14, 1947 3 Sheets-Sheet 3

INVENTOR.
EDWARD W. KELLOGG
BY [signature]
ATTORNEY

Patented Mar. 7, 1950

2,499,587

UNITED STATES PATENT OFFICE 2,499,587

CONTROL TRACK SOUND DISTRIBUTION SYSTEM AND RECORD THEREFOR

Edward W. Kellogg, Haddonfield, N. J., assignor to Radio Corporation of America, a corporation of Delaware Application February 14, 1947, Serial No. 728,699

9 Claims. (Cl. 179—100.3)

This invention relates to sound recording and reproducing systems, and particularly to the sound recording and reproduction of motion picture sound films.

Various types of sound recording and reproducing systems have been suggested together with various types and forms of sound tracks or records to produce improved and special results. With the continued improvement of the various elements which make up sound recording and reproducing systems for motion pictures, various changes in the method of distributing the sound and in the systems for recording and reproducing the sound have been suggested. To increase the amplitude range, recordable and reproducible from a sound track, various control track systems such as disclosed and claimed in Bierwirth U. S. Patent No. 2,335,575 of November 30, 1943, have been employed. To distribute the increased sound levels over a wider area, a system such as shown in Mueller U. S. Patent No. 2,361,490 of October 31, 1944, has been employed.

To increase the lower recordable level of a sound track, the "squeeze" track principle has been suggested, such a system for variable area tracks being shown in Livadary U. S. Patent No. 2,239,505 of April 22, 1941. Multiple sound track systems, wherein more than one track is recorded in the normal sound track area, are well-known, such a type of system being disclosed and claimed in Morgan U. S. Patent No. 2,332,333 of October 19, 1943, and copending application of W. V. Wolfe, Ser. No. 652,921, filed March 8, 1946.

The present invention is directed to an improved method of and system for recording a multiple sound track in the normal sound track area, for varying the reproduced level reproduced therefrom and for distributing the sound to a plurality of speakers. The type of sound track employed and the interrelated reproducing circuits produce a sound reproduction which provides the optimum in the presentation of the story being told by the picture and its concomitant sound. For instance, it has been found desirable that the dialogue of a sound track be limited to the center speaker located behind the screen on which the pictures are shown, while the music of large orchestras and sound effects, such as storms, earthquakes, etc., should be distributed among several speakers, including the center speaker, located across the front of the stage. In this manner, there is a better utilization of the increased sound level by way of a better presentation thereof to the audience. Observations with sound reproduced by three loud speakers, one behind the screen, and one well to either side, have established that when the side speakers are used their combined power output even on the music and sound effects should not exceed that of the center speaker. However, the distributed source provided by the three speakers has a spacious quality and impressiveness not possible with a single speaker.

Since the present invention utilizes a plural track which requires a two-channel reproducing system, and all theaters are not at present so equipped, it is desirable that the track be reproducible in the standard single cell and single channel reproducing system. Furthermore, since there are limitations to what may be accomplished with a two-track record, such as disclosed in the above-identified Morgan patent and copending application, it has been found necessary to further control the level of the signal and its distribution. Thus, a control track which may be of the type shown in the above-identified Bierwirth patent, has been added to accomplish fully the results desired. Furthermore, the type of recorded track differs from that shown in the above-identified Morgan patent in the proportioning of the sound track area. That is, this area is divided on a 75%–25% basis, all the dialogue being recorded in the 75% portion of the record area, and the sound effects and music being in the 25% portion only and also in the 75% portion. In this manner, the dialogue track will be given sufficient amplification to provide the desired dialogue volume in the center speaker while increased amplitudes for the music and sound effects will be obtained from the 25% portion with the proper division to maintain balance between the center and side speakers.

The principal object of the invention, therefore, is to facilitate the reproduction of sound records, particularly those accompanying motion pictures.

Another object of the invention is to provide an improved system for reproducing sound from film sound records.

A further object of the invention is to provide an improved sound track record and system for reproducing such a record.

A still further object of the invention is to provide an improved control track system in combination with a plural sound record.

A still further object of the invention is to provide a control track system capable of utilizing to maximum advantage a multiple source sound reproducing system.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 5 is a schematic view of another modification of the reproducing system.

Figure 1:
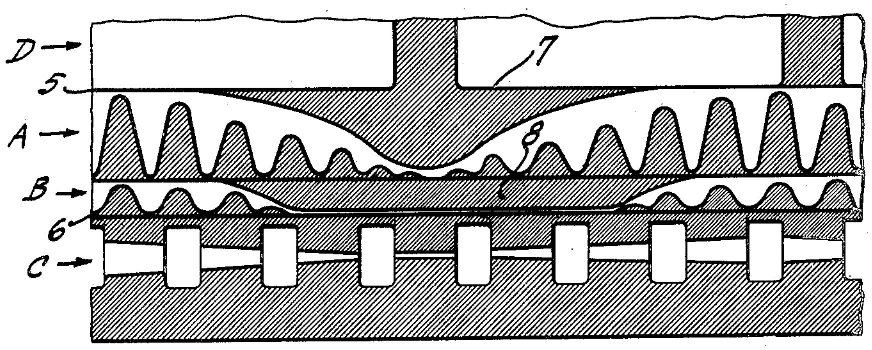
Fig. 1 is a view of a portion of a sound picture film recorded in accordance with the invention.

Referring now to Fig. 1, the sound track illustrated therein extends between the normal sound track area boundaries 5 and 6 and is composed of an A track section occupying 75% of the width between boundaries 5 and 6 and a B track section occupying 25% of the width of the normal sound track area. The film also has a control track extending along the sprocket hole section C, and a normal picture section D. Noise reduction is applied to the variable area sound tracks A and B at 7 and 8, respectively. Although the sound track section has been divided in a 75%–25% ratio, it is to be understood that there may be slight variations in this proportioning without departing from the scope of the invention.

Figure 2:
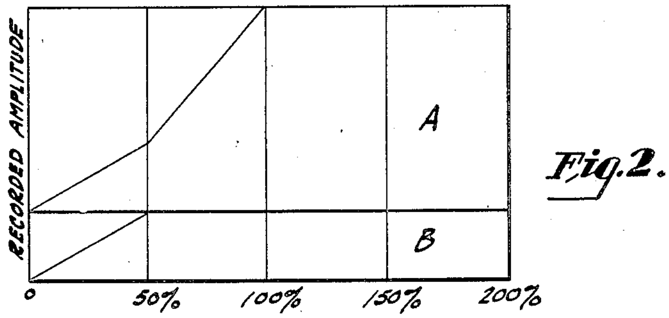
Figs. 2 and 3 are graphs illustrating the operation of the system.

Referring now to Fig. 2, this figure illustrates a division of the recorded amplitudes in the sound track sections A and B. Although all the dialogue is recorded in the A track section, music and sound effects will be recorded in both the A and B sections. The abscissa in Fig. 2 is the desired sound level in the theater in percentage of the level which would be produced by a full width track at normal gain. As long as the sum of the amplitudes on the two tracks adds up to be directly proportional to the desired total level, the complete track will reproduce in a standard system at proper levels. Thus, up to 50% of full track, the music is recorded equally in A and B tracks as indicated. At that point, the B track is full, but the A track level increases at an increased rate so that it becomes full at 100% normal level. The A and B tracks will be recorded simultaneously, and, with two galvanometers having substantially no phase distortion, the output from the two tracks, when combined to provide the input to a single speaker, will give direct voltage addition (and not a root mean square addition) and will thus give the same sound level in the theater as though there were a single recording occupying the full track width.

In a system of sound reproduction for motion pictures, it is realized that during a large part of the time no spread sound effect is required. Under this condition, the outputs of the two portions of the track should be combined at equal amplifications and applied to the center speaker. This condition is met by making provision that when no control tone whatever is recorded, the side speaker amplifier is inactive and the outputs of the two tracks are added at equal gain for supplying power to the center speaker. If spread sound effects are wanted, control tone is recorded. This has no effect on the amplification between the A track and the center speaker, but causes the output from the B track to be applied to the side speakers, at first at fixed gain, and then, as the control tone level is increased, at increasing gain. With still further increase in control tone, the B track output is supplied to both center and side speakers, at amplification values which will keep the desired balance. When the desired music levels call for more output from the center speaker than is provided with the fixed amplification when the A track is full, further increase in the music levels must be obtained by using the B track not only to supply the side speakers, but also to supply part of the power to the center speaker.

Figure 3:
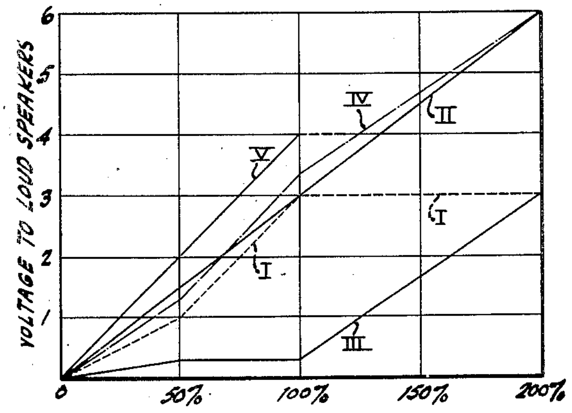

Now, referring to Fig. 3, which illustrates (with the exception of curve V) conditions with control tone present, the abscissae are the same as for Fig. 2 and the ordinates represent the relative voltages applied to the loud speakers through each channel, the vertical scale being such that unity corresponds to 25% track modulation multiplied by normal gain. Curve I in Fig. 3, shown dotted, represents the voltage supplied to the center speaker from the A track. It will be noted that this voltage is a constant times the amplitude of the recording in the A track, shown in Fig. 2, the gain or amplification in this channel being constant. Curve II shows the voltage applied to the side speakers, which is derived entirely from the B track. This characteristic is obtained by employing fixed gain for all desired levels below the point marked 50%, variations within this range being determined by the amplitude of the recording in the B track area. For high levels the B track is full (i. e. recorded at the maximum amplitude short of overloading) and increased loud speaker input is obtained by increasing the amplification. Curve III represents the voltage applied to the center speaker from the B track. This is kept at a low value throughout the range wherein the A channel can supply all the desired voltage to the center speaker, and increases rapidly when higher sound levels are wanted. The total voltage applied to the center speaker is the sum of the voltages indicated in curves I and III, this sum being shown by the dot and dash line curve IV. It will be noted that curve IV is sufficiently close to curve II to keep the desired balance between the center and side speakers. If the A and B tracks were both reproduced on the center speaker, at unity gain, the voltage applied to the center speaker would be as shown by curve V, which represents the center speaker level when no control tone is recorded, and is exactly the same as the levels from a standard theater channel.

From these curves, it will be seen that when the reproduction is changed from the center speaker to a spread source, the level on the center speaker drops to approximately 75% due to the substantial switching out of the B track. If the drop went to 71%, the total acoustic power would be the same for the two conditions. By the use of a control track, it is possible to increase the total sound pressures in the theater to differ from that which would be derived from the standard system, as shown in Fig. 3, and the following circuits will produce the results desired.

Figure 4:
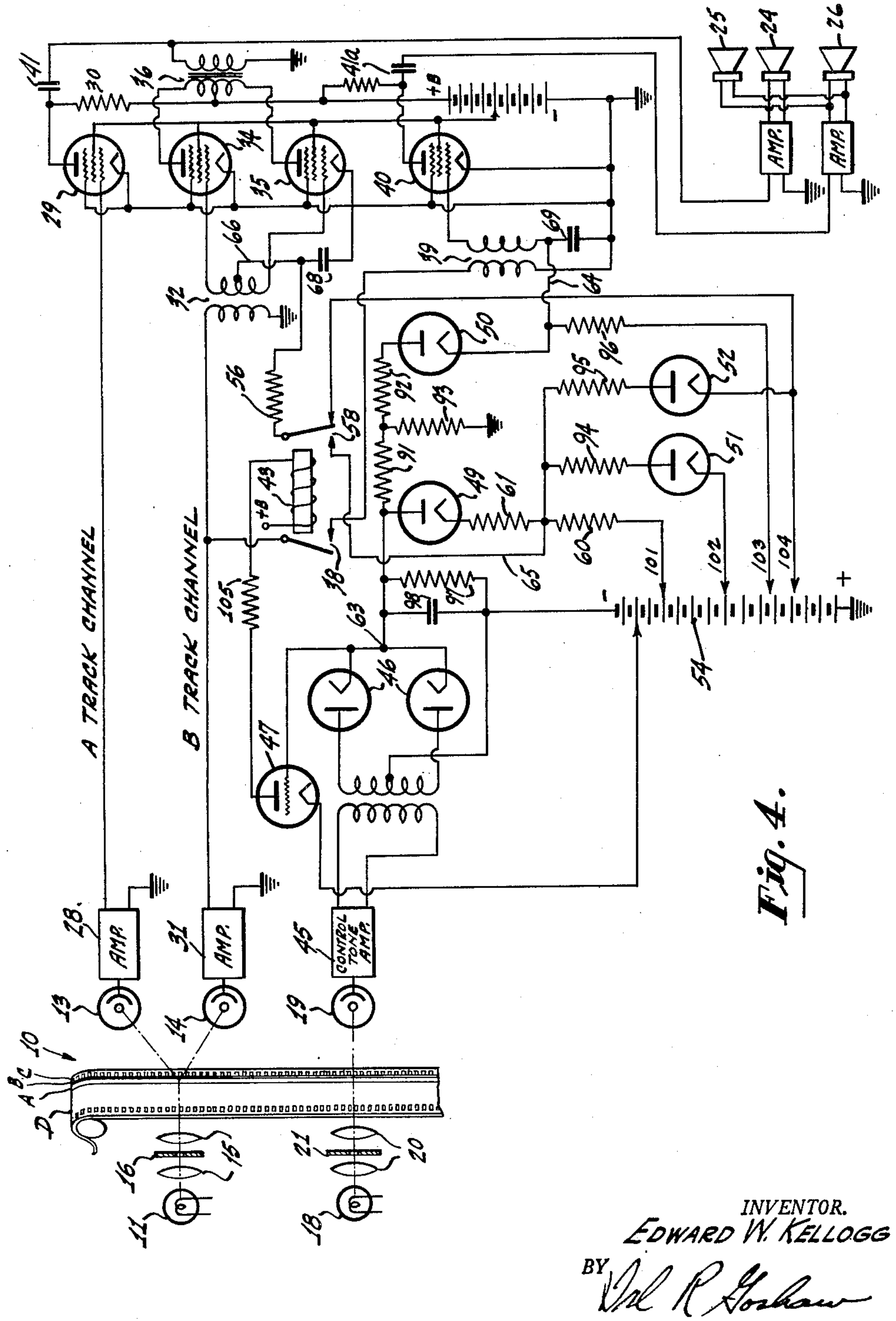
Fig. 4 is a diagrammatic, schematic view of one embodiment of the reproducing system.
Figure 7:
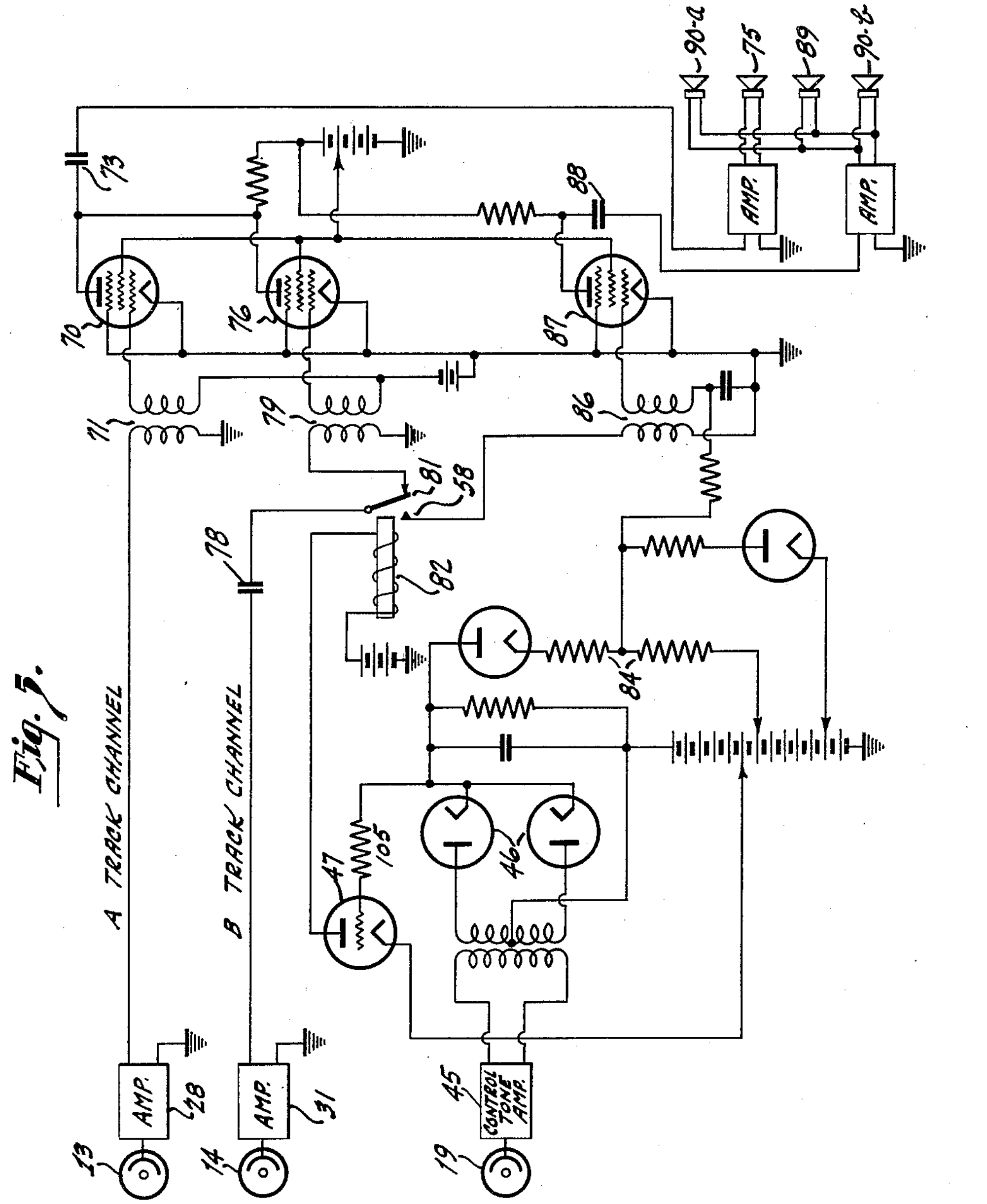

To provide the above distribution of power, the circuit shown in Fig. 4 is provided. Referring now to this figure, a sound motion picture film is shown at 10 having A, B, C and D portions, as illustrated in Fig. 1. This film is advanced between a light source 11 with its optical system including a pair of lenses 15 and slit mask 16, and a pair of photoelectric cells 13 and 14. The photoelectric cell 13 receives light emerging through the A track secton, and photoelectric cell 14 receives light emerging through the B track section. A second scanning system is shown with a light source 18, a photoelectric cell 19, optical elements 20, and a slit mask 21. The light from the source 18 to the photoelectric cell 19 passes through the sprocket hole control track section C. The output of the circuit serves to control the gain of the amplifiers supplying power to the center speaker 24 and side speakers 25 and 26.

The photoelectric cell 13 is connected to an amplifier 28 and then directly to an amplifier 29, the output of which is coupled through a condenser-resistance network 30 to the amplifier supplying power to the center speaker 24. This channel, except for the usual manual adjustment, has a fixed gain, and, therefore, the voltage feed from track A to the center speaker will always be proportional to the amplitude recorded on track A.

Referring now to the B track channel, the output of photoelectric cell 14 is amplified in amplifier 31 which is connected to an input transformer 32 feeding a push-pull amplifier comprising tubes 34 and 35. The output of this push-pull amplifier is connected over transformer 36 to feed the center speakers. Bridged between amplifier 31 and the push-pull amplifier 34—35, is a relay contact 38 connecting a transformer 39 in the input of an amplifier tube 40 to the B track channel. The output of amplifier 40 is connected through a condenser 41*a* to the power amplifier feeding side speakers 25 and 26, it being realized that the amplifier 40 will receive no signal unless the contact 38 is closed by energization of a relay 43. This relay is shown in its position when there is no control tone. The control tone circuit includes the amplifier 45, a full-wave rectifier 46, a direct current amplifier 47, and a voltage dividing network including rectifiers 49, 50, 51 and 52.

In operating the system shown in Fig. 4, when there is no control tone, the tube 47 is biased to cut-off by a lattery source 54 and the relay 43 is not energized. In this case, any modulations on the B track will be fed only to the push-pull stage 34—35, but which is so biased over resistor 56 and battery 54, that the B track contributes the same voltage per unit of modulated light to the center speaker as the A track. The effect of this is the same as if the output of both photoelectric cells 13 and 14 were fed directly to the center speaker through a single channel, or as would obtain in a standard system having only a center speaker.

Now, if a control tone impresses voltage on rectifier 46, the negative bias on the grid of tube 47 is reduced, so that the tube begins to conduct current, and the relay 43 is actuated to close contact 38, causing the B channel to begin to supply voltage to the input of the amplifier 40 feeding the side speakers. The initial bias on tube 40 is at a value which, taken in connection with the ratio of transformer 39, results in normal gain between the B track and the side speakers. With the output of the B track now coming from the side speakers, it is appropriate that this sound no longer come from the center speaker. This is accomplished not by disconnecting the B track output from amplifier 34—35, but by increasing the negative bias on the grids of these tubes to a value at which the B track contributes a negligible voltage to the center speaker channel. However, the center speaker continues to supply as much of the music and sound effects as are recorded in the A track, thus giving the desired balance. The condition just described is maintained for all values of desired output less than the 50% point of Fig. 3. There is a margin of control tone level between that which is sufficient to cause the relay 43 to operate, and the values above which rectifiers 49 and 50 will carry current, and so long as the control tone level is within this margin, all of the amplifiers remain at a fixed bias. No change takes place until it becomes desirable to increase the gain of the B track to the side speakers, and this is when the B track is recorded at full amplitude. With increase in control tone amplitude and corresponding rectifier voltage, the diode 50 begins to conduct current and the grid bias on tube 40 changes in the positive direction, thereby increasing the amplification, which continues to increase with control tone level, up to the 200% point of Fig. 3.

The B track supplies practically no voltage to the center speaker until that from the A track, is no longer sufficient, or for levels above 100%. Above this point, increasing audio voltage from the B track must be added through amplifier 34—35. Since these tubes were biased to a point of very low gain, and in view of the shape of the gain-vs.-grid bias characteristics of variable-gain tubes, it is necessary to shift grid bias rapidly at first and then more slowly. This is accomplished by the network comprising diodes 51 and 52 and their associated resistors 94 and 95. During the condition of fixed bias, no current flows through any of these diodes and the bias on tubes 34—35 takes the value determined by the position of battery tap 101. When the control tone rectifier develops sufficient voltage to make conductor 63 and the anode of diode 49 positive with respect to tap 101, current flows through diode 49 carrying the grid conductor 65 positive, at a rate, compared with the rate of increase of control tone rectifier voltage, determined by the ratio of resistance 60 to that of 60 and 61 in series. As conductor 65, connected through contact 58 and transformer 66 to the grids of tubes 34—35, moves in the positive direction, the required rate of bias change becomes less, and this reduced rate is brought about by progressive loading of the network with lower resistances. Diodes 51 and 52 successively become conducting and cause their resistors to become shunts to constant potential points. This progressive loading causes the grid bias of the amplifier 34—35 to change in such a manner as to produce a substantially linear relationship between gain and control track amplitude. The fact that diode 50 becomes conducting before diode 49, in spite of the fact that its cathode is connected to a point 103 of less negative potential than 101, is explained by the ground connection in the T network 91, 92 and 93 in the anode circuit of tube 50, which in effect biases the anode in the positive direction, because some current flows from ground through resistances 93, 91 and 97 to the negative terminal of battery 54.

As an illustration of an actual design:

Tubes 34, 35 and 40 are RCA radiotrons 6K7
Capacitor 98, .5 mf.
Capacitor 68, .25 mf.
Capacitor 69, .25 mf.
Resistance 97, 10,000 ohms
Resistance 56, 500,000 ohms
Resistance 61, 50,000 ohms
Resistance 60, 300,00 ohms
Resistance 94, 25,000 ohms
Resistance 95, 14,250 ohms
Resistance 91, 63,000 ohms
Resistance 92, 120,000 ohms
Resistance 93, 22,000 ohms
Resistance 105, 1 megohm
Battery 54—total voltage
Tap 101 voltage—16
Tap 102 voltage—13
Tap 103 voltage—11
Tap 104 voltage—10

The amplifier 34—35 for the center speaker has been illustrated as of the push-pull type, while that for the side speakers is shown as of the single tube type. This is done in part to emphasize the point that either type of variable-gain amplifier might be used. In general it is considered desirable to employ push-pull amplifiers for variable-gain applications. In the case of the amplifier 34—35 and also amplifier 40, the changes of grid bias (to alter gain) are introduced through fairly high resistances, 56, 92 and 96 and condensers 68 and 69 connected to ground, serve to prevent too sudden a change in grid bias, which would produce an objectionable noise. The push-pull system balances out a large part of such noise, as well as reducing distortion. These features are more necessary in amplifier 34—35, than in 40 for the reason that the former is carried through a wider range of gain.

Referring to Fig. 5, a simplified system is illustrated, simplification being accomplished by locating a spread source speaker 89 at the center speaker position in addition to those which are located at the sides. In this arrangement, whenever the control tone is present, the B track supplies the spread speakers at an amplification determined by the amplitude of the control tone, leaving the center speaker to carry only the dialogue. It will be noted in Fig. 5 that the same photoelectric cells 13, 14 and 19 are employed, and the same amplifiers 28, 31 and 45 are used as in the system shown in Fig. 4. The A channel also includes an amplifier 70 and a coupling transformer 71. The amplifier 70 is connected over a condenser 73 to the power amplifier which feeds the center or dialogue speaker 75, while the amplifier 76 in the B channel is also coupled to the same power amplifier over the condenser 73. The amplifier 31 is coupled to the amplifier 76 over a condenser 78 and transformer 79, and a contact 81 of a relay 82. Thus, in the absence of a control tone, the A and B track sections are both fed to the center speaker at unity gain resulting in the same type of reproduction as a single channel would provide.

The control circuit includes the full-wave rectifier 46 and direct current amplifier 47, as shown in Fig. 4, together with a variable biasing network and rectifiers 84. When control tone is present to permit current to flow from the tube 47, the relay 82 will be energized and the front contact of the relay will close. The energization of relay 82 disconnects the B channel from the center speaker and connects it over a coupling transformer 86 to an amplifier tube 87, the output of which is coupled over a condenser 88 to the power amplifier feeding the spread source speakers, 90—*a* and 90—*b*, and a third spread source speaker 89 located near the center speaker position. In this simplified circuit, the gain of the amplifier 87 will vary with the amplitude of the control tone and balance will thereby be maintained between the sound originating behind the screen and that from the side speakers. In this system, of course, music and sound effects requiring a spread source must be confined to the B track, because if not, the center speaker will put out some of the sound and upset the balance, while if the music is confined to the B track, it may not give as high levels in standard theaters as may be often desired. By accepting a slight compromise, however, with respect to balance, as much music as it will carry will be recorded in the B track and just enough in the A track to give the desired level in standard theaters, and thereby, the simplified system in Fig. 5 will give as satisfactory results as the system shown in Fig. 4. In both systems it is preferable to use speakers for the spread source which are less directional than the center speaker which carries the dialogue. The nondirectional speakers radiate more sound toward the side walls and ceiling than would more directive speakers, and thus enhance the spread source effect.

I claim:

1. A sound reproducing system comprising a plurality of signal sources, a plurality of speakers for reproducing said sources, amplifiers having a constant gain interconnecting one of said signal sources with a certain one of said speakers, amplifiers having a variable gain connecting another of said signal sources with said certain speaker and a plurality of additional speakers, relay means for switching said other channel source between said certain speaker and said additional speakers, and a rectifier connected to another of said signal sources for actuating said relay means and for controlling the gain of said variable gain amplifiers and the division of the signal among said speakers.

2. A sound reproducing system for a motion picture sound film comprising a center speaker and a plurality of side speakers, a photoelectric cell for detecting a certain portion of a sound track on said film, means for connecting said photoelectric cell with said center speaker, a second photoelectric cell adapted to detect another portion of said sound track on said film, means for connecting said second photoelectric cell to said center speaker and also to said side speakers, switching means between said second photocell and said side speakers, and a control signal source for actuating said switching means for connecting and disconnecting said second photocell to and from said side speakers and for controlling the amount of said second detected portion of said sound track fed to said center and side speakers.

3. A system for obtaining sound reproduction from a sound record having a wide, high amplitude portion, a narrow, low amplitude portion, and an amplitude control portion, a plurality of speakers, a constant gain amplification channel interconnecting the output of said wide track portion with a certain speaker, a variable gain amplification channel interconnecting the output of said narrow track portion with said certain speaker, a third amplification channel interconnecting the output of said narrow track portion with additional speakers, switching means for connecting and disconnecting the output of said narrow track portion to and from said additional speakers, and a fourth channel connected to the output of the control portion for actuating said switch means and for controlling the rate of amplification of the output of said narrow track portion as impressed on said speakers.

4. A sound record on a single medium, comprising a wide longitudinal section in which is recorded a combination of dialogue and background effects, and a narrow longitudinal section in which is recorded said background effects, the transverse width of said sections determining the relative reproducible sound levels therefrom.

5. A sound record on a single medium in accordance with claim 4, in which said wide section is substantially three times the width of said narrow portion.

6. A sound record on a single medium, comprising a wide longitudinal section in which is recorded a combination of dialogue and background effects, a narrow longitudinal section in which is recorded said background effects, and a third section in which is recorded a control track for varying the gain and distribution of the sound from said sections.

7. A sound reproducing system, comprising multiple signal reproducing channels, a plurality of speakers, one of said channels including a signal pickup means and an amplifier having a constant gain connected to certain of said speakers, another of said channels including a second signal pickup means and an amplifier having a variable gain and connected to said certain speakers, a third channel including a variable gain amplifier connectable and disconnectable to said second channel and connected to other of said speakers, a fourth channel including a third signal pickup means, and means in said second and third channels connected thereto for controlling the connection and disconnection of said third channel to said second channel and the gain of said variable gain amplifiers.

8. A sound reproducing system for a plural track sound record including a high level track and a low level track, comprising a central speaker and side speakers, means including a signal pickup for said high level track and a fixed gain amplifier connected to said central speaker, means including a signal pickup for said low level track and a variable gain amplifier connected to said central speaker, means including a third channel connectable and disconnectable from said second channel and a variable gain amplifier connected to said side speakers, means including a signal pickup from a third of said tracks for obtaining a control current, and means for utilizing said control current for disconnecting said second mentioned pickup means from said side speakers.

9. A sound reproducing system in accordance with claim 8, in which said last mentioned means includes a relay actuated by said control current, for connecting and disconnecting said second mentioned signal pickup from said side speakers, and connecting gain varying means to said first mentioned variable gain amplifier.

EDWARD W. KELLOGG.

REFERENCES CITED

The following references are of record in the file of this patent:

UNITED STATES PATENTS

| Number | Name | Date |
|---|---|---|
| 2,292,014 | Roberts | Aug. 4, 1924 |
| 2,314,382 | Batsel | Mar. 23, 1943 |
| 2,324,781 | Kolb | July 20, 1943 |
| 2,361,490 | Mueller | Oct. 31, 1944 |
| 2,402,095 | Slyfield | June 11, 1946 |